United States Patent Office 2,773,752
Patented Dec. 11, 1956

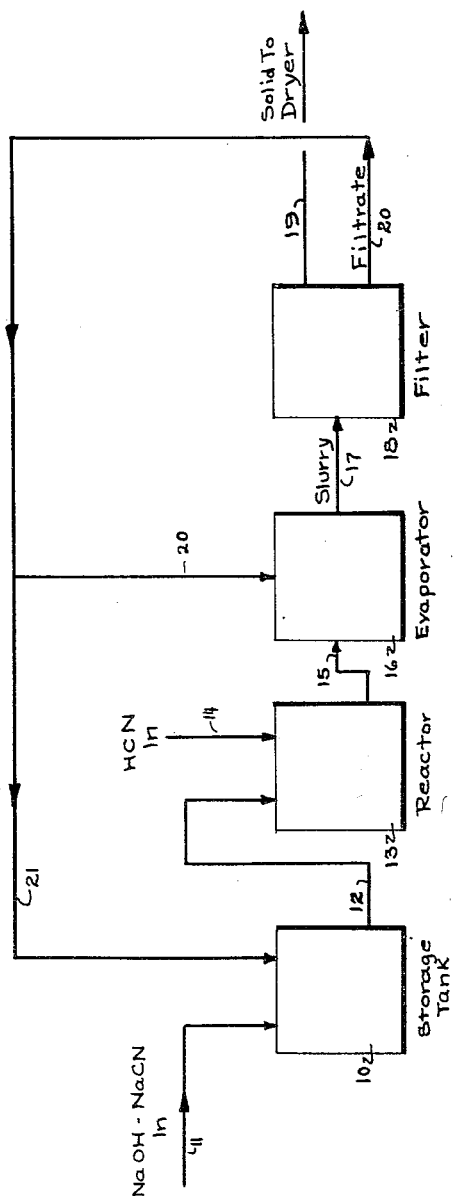

2,773,752

CRYSTALLIZATION OF SODIUM CYANIDE

Vincent W. Kremer and Charles H. Lemke, Niagara Falls, N. Y., assignors to E. I. du Pont de Nemours & Company, Wilmington, Del., a corporation of Delaware Application July 20, 1953, Serial No. 369,034

4 Claims. (Cl. 23—302)

This invention relates to the crystallization of sodium cyanide and more particularly to the crystallization of sodium cyanide from solutions made up by neutralizing caustic with hydrogen cyanide.

Wet methods for making sodium cyanide, that is methods employing gaseous hydrogen cyanide to neutralize aqueous caustic solutions, have been known for many years. Thus Roessler (U. S. P. 716,350) developed such a process as long ago as 1902. Although this patent and others directed to the same type of process are quite old, the sodium cyanide of commerce has generally been prepared by the Castner process employing ammonia introduced into a mixture of carbon and metallic sodium at an elevated temperature. The Castner process has the advantage over the wet processes that it does not require separation of product sodium cyanide from water. This separation is difficult because the cyanides tend to hydrolyze in aqueous solution yielding a variety of decomposition products. A major object of this invention is, therefore, development of a novel and useful method for recovering sodium cyanide from aqueous solution.

Among the hydrolysis products that may be formed in aqueous sodium cyanide solutions, especially when any attempt is made to crystallize the solid from the solutions, is hydrogen cyanide. Formation of this compound obviously detracts from the over-all yield obtainable. Additionally, hydrogen cyanide has a very marked tendency to polymerize into a series of compounds most of which are colored. These polymerization products may appear as yellow or red solutes or as heavy brown to black flocculent precipitates. Whatever the particular color formed in an evaporating solution, it is generally carried over into the crystalline product. Another object of this invention is consequently development of a process for recovering white solid sodium cyanide from aqueous solution.

Despite the technological difficulties inherent in the wet processes, attention has recently been again drawn to them because of the increased demand for cyanides originating particularly in the artificial fibre industry. These processes afford opportunity for the continuous reactions, as opposed to batch reactions, essential if the increased demand is to be met. A further object of this invention is development of a method for continuously recovering white sodium cyanide from aqueous solution.

It has been found that decomposition of sodium cyanide in aqueous solution can be substantially repressed, even at the relatively high temperatures and concentrations required for crystallizing the solid, by maintaining a quantity of free sodium hydroxide in the evaporating solution. Free alkali has the further advantage of preventing the polymerization of hydrogen cyanide as long as the alkali is present in excess. Control of the amount of free sodium hydroxide in solution, however, presents a problem, particularly where a continuous process is involved. In such a process there is a tendency for the caustic content of the evaporating solution to increase, resulting eventually in a product containing more sodium hydroxide than any specification for sodium cyanide could tolerate. An additional object of the invention is development of a continuous process for recovering white sodium cyanide from aqueous solutions in which the concentration of sodium hydroxide in the solutions can be easily controlled.

The above-enumerated and other objects of the invention may be accomplished by a process in which a solution of sodium cyanide is continuously concentrated in a vacuum evaporator within which the caustic content is maintained between critical limits and the resultant crystals withdrawn from the solution at a relatively low temperature. Generally the solutions treated in this manner will have been made by neutralizing sodium hydroxide with hydrocyanic acid. The invention is, however, not restricted in applicability to solutions prepared in this manner but may be extended to cover solutions made in other ways as well. The reaction of calcium cyanide with sodium carbonate in solution may for example also be used to prepare the sodium cyanide. Any carbonate or other precipitates formed should be removed as by filtration before the sodium cyanide is recovered.

Whatever the source of the sodium cyanide solution, it should be carefully adjusted to a sodium hydroxide content of at least 0.2–1.0% by weight before it is passed into the evaporator. The caustic content in the evaporator may then be allowed to build up to about 2–3% but this figure should not be exceeded or the final product will contain an undue percentage of diluent sodium hydroxide. Consequently, no large bath of original mother liquor should be evaporated to complete dryness. This difficulty may be overcome by withdrawing some of the mother liquor and treating the withdrawn portions with additional hydrogen cyanide. Preferably a slurry containing some of the crystallized material together with its mother liquor is removed from solution and filtered. At least part of the mother liquor comprising the filtrate may be then neutralized with hydrogen cyanide and returned to the evaporator.

If the proper concentration of hydroxide is maintained at the evaporator, hydrolysis of the sodium cyanide into hydrocyanic acid and polymerization of the latter into discoloring impurities can be avoided. Temperature and pressure conditions, however, still require careful control. Normal pressures require such a high boiling temperature that noticeable decomposition and product discoloration may occur even at high alkalinity. Excess alkalinity must at any rate be avoided during evaporation to avoid serious impairment in the value of the sodium cyanide obtained. A caustic concentration of about 2–3% can, as noted, insure high-test sodium cyanide in good yield but only if the evaporation is carried out under about 40–100 mm. of mercury pressure and a temperature of 50–70° C. A preferred pressure range is between about 40 and 80 mm. of mercury. Lower pressures can, of course, be used but are not necessary. Details of the invention will be more readily understood from the following examples and from:

The drawing, which shows schematically apparatus for carrying out a preferred embodiment of the invention.

*Example 1*

A control run was made to determine the effects of evaporation on aqueous sodium cyanide. A solution of 98.3% sodium cyanide in water with an initial concentration of around 35% by weight was boiled to dryness in 40 minutes at 40–70° C. and 28–50 mm. of mercury pressure. The recovered product contained 93.4% sodium cyanide and 3.47% water. Removal of the water gave sodium cyanide of only 96.5% purity. These figures show about 1.8% decomposition of the cyanide in the relatively short period required for evaporation and at the low temperatures and pressures employed.

*Example 2*

A series of runs was made to show the effect of sodium hydroxide additions on the decomposition rates of nearly saturated (40–42%) solutions of sodium cyanide. Pressures utilized were atmospheric. A solution containing 0.5% sodium hydroxide in addition to the sodium cyanide showed, in one hour, 0.12% decomposition at 60° C., 0.24% at 70° C. and 0.85% at 80° C. A solution containing 1.0% hydroxide in addition to cyanide gave 0.1% decomposition in one hour at 60° C., 0.2% in one hour at 70° C. and about 0.75% in one hour at 80° C. Use of 2.0% caustic in the saturated sodium cyanide solutions reduced the decomposition in one hour to about 0.05% at 60° C., 0.14% at 70° C., and 0.58% at 80° C.

*Example 3*

A cyclic process was carried out in which a concentrated solution of sodium hydroxide was continuously neutralized with hydrogen cyanide to a content of about 38% sodium cyanide and 0.2–1.0% sodium hydroxide. After neutralization, the alkaline cyanide solution was continuously passed into an evaporator and concentrated at a pressure of about 60 mm. of mercury and a temperature of 60–70° C. The slurry which formed in the evaporator was continuously withdrawn and filtered. The wet white product was removed and dried while a portion of the filtrate was returned to the evaporator. The remainder of the filtrate was recycled to the original sodium hydroxide solution and again neutralized with the latter. By means of this recycling step the caustic concentration in the evaporator was maintained at around 2% and prevented from building up to higher levels.

The drawing shows schematically conventional apparatus in which the process described here may be carried out. Storage tank 10 is provided to retain and mix the required alkaline reagents. Line 11 introduces sodium hydroxide solution, partially neutralized by hydrogen cyanide into tank 10. Through line 12 the liquid reactants are conducted to reactor 13 into which gaseous hydrogen cyanide is fed through line 14. This reactor may be of any convenient form although a jet type (not shown), is preferred. Sodium cyanide solution containing 0.2–1.0% sodium hydroxide is fed through line 15 into evaporator 16 and thence through line 17 to filter 18. Solid is conveyed through line 19 to a dryer and the filtrate through lines 20 and 21 to the evaporator 16 and storage tank 20 respectively. Line 21 permits the recycling step necessary to prevent the caustic content of the evaporator from building up to an extreme level. Conventional pumps (not shown) are, of course, located to provide the necessary liquid flow.

In one run of the process of this example, the feed to the evaporator was at a rate of 4 parts per hour of which about 1.5 parts consists of filtrate recycled directly to the evaporator, and the remainder of fresh material. Slurry was continuously withdrawn at a rate of about 3.4 parts per hour and filtered to yield 0.5 part of white crystals carrying about one-third their weight of mother liquor. These crystals were then dried to give a white product analyzing about 96–98% sodium cyanide, less than 1% sodium hydroxide and less than 2% sodium carbonate.

It will be seen that the cyclic process of Example 3 yields an acceptable product with very slight decomposition losses. Some modifications in the process are, nevertheless, possible. Recirculation of mother liquor for neutralization may, for instance, be increased or decreased as desired. Decreasing the recirculation will generally increase the hydroxide content of the evaporator while increasing the recirculation will reduce it. In practice the hydroxide content of the dried cyanide is about one-third that of the mother liquor. Around 1% is the maximum sodium hydroxide tolerable in the solid cyanide. The concentration of sodium hydroxide in the evaporator should not therefore be built up above about a 3% maximum with 2–2.5% preferred.

Having now described our invention, we claim:

1. The method of producing white crystalline sodium cyanide which comprises continuously feeding a concentrated solution of sodium cyanide into an evaporator held at a temperature of 50°–70° C. and a pressure of 40–80 mm. of mercury, forming a slurry in said evaporator comprising saturated mother liquor and crystals of sodium cyanide, maintaining a concentration of sodium hydroxide of between 0.2 and 3% in said mother liquor and continuously separating a portion of said crystals from said mother liquor and recycling a portion of said liquor.

2. The method of producing white crystalline sodium cyanide which comprises continuously feeding a concentrated solution of sodium cyanide into an evaporator held at a temperature of 50°–70° C. and a pressure of 40–80 mm. of mercury, forming a slurry in said evaporator comprising saturated mother liquor and crystals of sodium cyanide, maintaining a concentration of sodium hydroxide of between 0.2 and 3% in said mother liquor, continuously withdrawing part of the slurry from the evaporator, filtering the crystals from the withdrawn portion of the slurry and recycling the filtrate to the evaporator.

3. The method of claim 2 in which the concentration of the sodium hydroxide is maintained at the desired level by reacting part of said filtrate with hydrocyanic acid before returning the same to the evaporator.

4. The method of forming white crystalline sodium cyanide which comprises continuously neutralizing a concentrated solution of caustic soda with hydrocyanic acid to a caustic content of 0.2–1.0%, continuously feeding the resultant sodium cyanide solution into an evaporator held at a temperature of 50–70° C. and a pressure of 40–80 mm. of mercury, maintaining a caustic concentration in the evaporator of 0.2–3%, continuously producing sodium cyanide crystals in the evaporator, continuously removing the crystals together with attendant mother liquor, filtering the crystals from the mother liquor and drying them with heat, recycling a first portion of the mother liquor to the evaporator, neutralizing a second portion of said mother liquor with hydrocyanic acid to a caustic content of 0.2–1.0% and returning the second portion of neutralized mother liquor to the evaporator.

References Cited in the file of this patent

UNITED STATES PATENTS

| | | |
|---|---|---|
| 716,350 | Roessler | Dec. 16, 1902 |
| 859,482 | Bueb | July 9, 1907 |
| 1,531,123 | Mittasch et al. | Mar. 24, 1925 |
| 2,365,417 | Kusman | Dec. 19, 1944 |
| 2,616,782 | Cain et al. | Nov. 4, 1952 |
| 2,708,151 | McMinn | May 10, 1955 |